Figure 1:
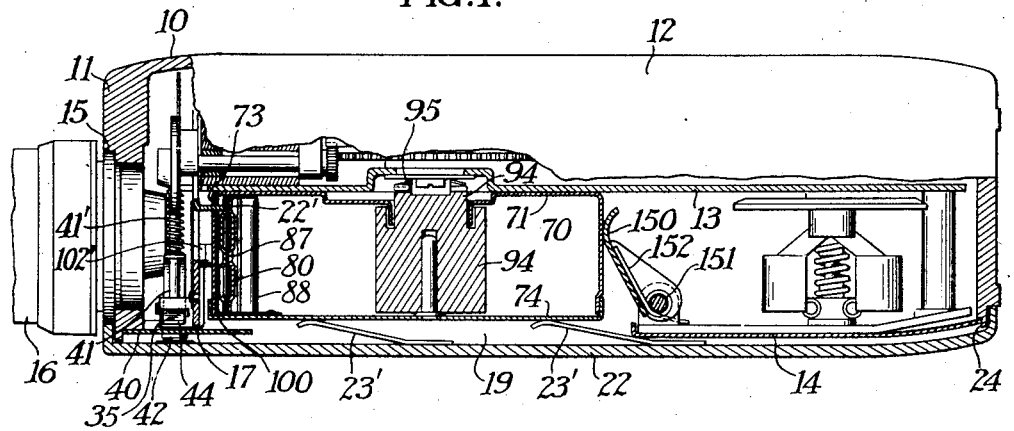

July 11, 1939.  H. N. FAIRBANKS  2,165,363

MOTION PICTURE APPARATUS

Filed March 11, 1937  2 Sheets-Sheet 1

Henry N. Fairbanks
INVENTOR.

BY
ATTORNEYS

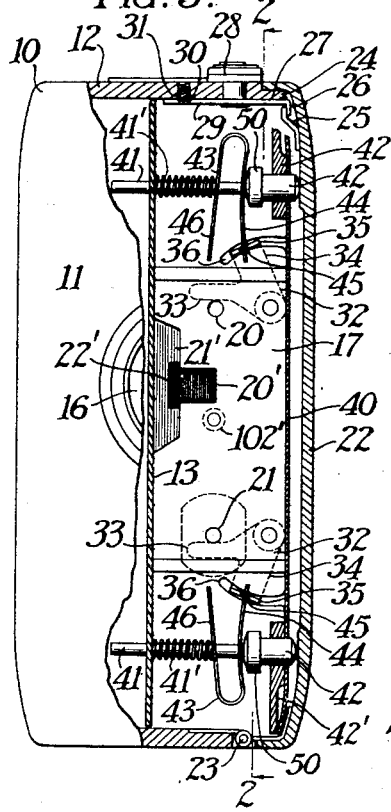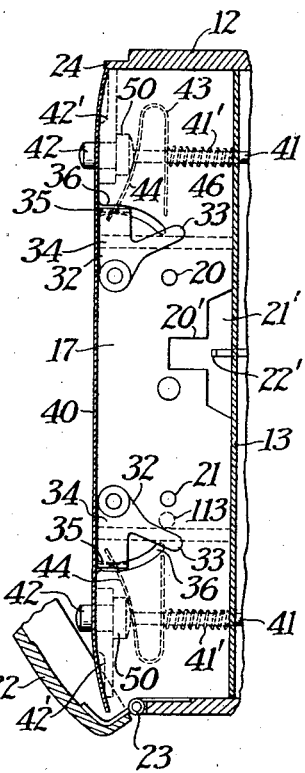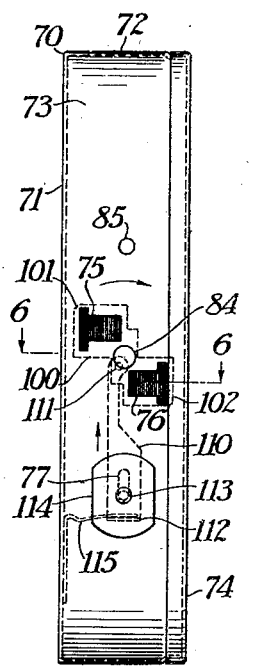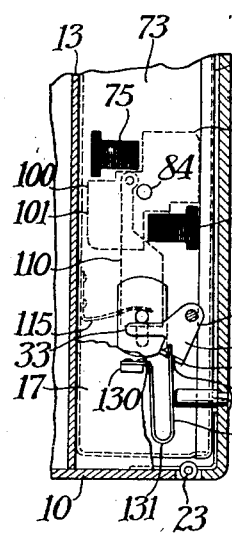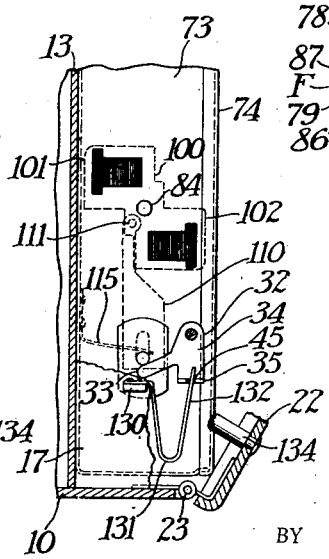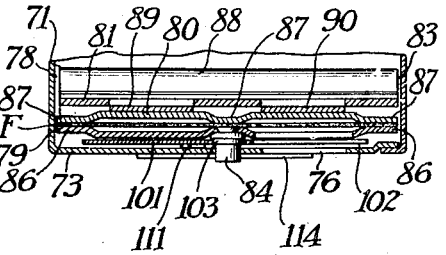

Patented July 11, 1939

2,165,363

UNITED STATES PATENT OFFICE 2,165,363

MOTION PICTURE APPARATUS

Henry N. Fairbanks, Rochester, N. Y., assignor to Eastman Kodak Company, Rochester, N. Y., a corporation of New Jersey Application March 11, 1937, Serial No. 130,343
In Germany September 19, 1936

15 Claims. (Cl. 88—17)

This invention relates to a motion picture apparatus of the magazine type, and particularly to a closure means for a film magazine and an arrangement within the motion picture apparatus for operating the closure means when the door of the apparatus is closed.

Light sealing shutters for film magazines are well known, but are generally slidable with respect to the magazine and operated individually or automatically upon insertion of the film magazine into the apparatus. It is also known to control light sealing shutters for film magazine by means of a bolt on the camera housing in such a manner that, on bolting the camera housing after the film magazine has been inserted therein the shutter is opened, and conversely, the shutter is again closed when the camera housing is unbolted prior to removing the film magazine therefrom.

One object of the present invention is to provide a camera of the magazine type with an operating mechanism which is adapted to engage a shutter actuating pin on the film magazine when said magazine is inserted in the camera, and be actuated by the closing of the camera door to automatically open the magazine shutter.

Another object is to provide an operating member as above referred to which is adapted to compensate for lost motion between the parts, and thereby permit movement of the camera door after the magazine shutter is opened.

The novel features that I consider characteristic of my invention are set forth with particularity in the appended claims. The invention itself, however, both as to its organization and its method of operation, together with additional objects and advantages thereof, will best be understood from the following description of specific embodiments when read in conjunction with the accompanying drawings in which, Fig. 1 is a plan view, partly in section along line 1—1 of Fig. 2, and showing the magazine in place in the camera, Fig. 2 is a side elevation of a motion picture apparatus containing a film magazine, with the door and certain parts thereof removed to show the operating mechanism for the magazine shutter, Fig. 3 is a partial section taken on line 3—3 of Fig. 2 and showing that part of the magazine shutter actuating mechanism forward of the locating plate, Fig. 4 is a partial section taken on line 4—4 of Fig. 2, and showing that part of the magazine shutter mechanism behind the locating plate, Fig. 5 is a front elevation of a film magazine equipped with a pivoted shutter, Fig. 6 is a fragmentary cross section through the film gate of the magazine and taken on line 6—6 of Fig. 5, Fig. 7 is a partial section taken on line 3—3 of Fig. 2 with the locating plate partially removed for purposes of clarity, and showing a modified form of shutter operating mechanism in shutter opening position, and, Fig. 8 is the same as Fig. 7, and showing the shutter operating mechanism in inoperative position.

Like reference characters refer to corresponding parts throughout the drawings.

For the purpose of illustration the invention is to be described with respect to a motion picture camera of the magazine type, but it is to be understood that the invention may be used on other apparatus where magazines are used.

Figure 2:
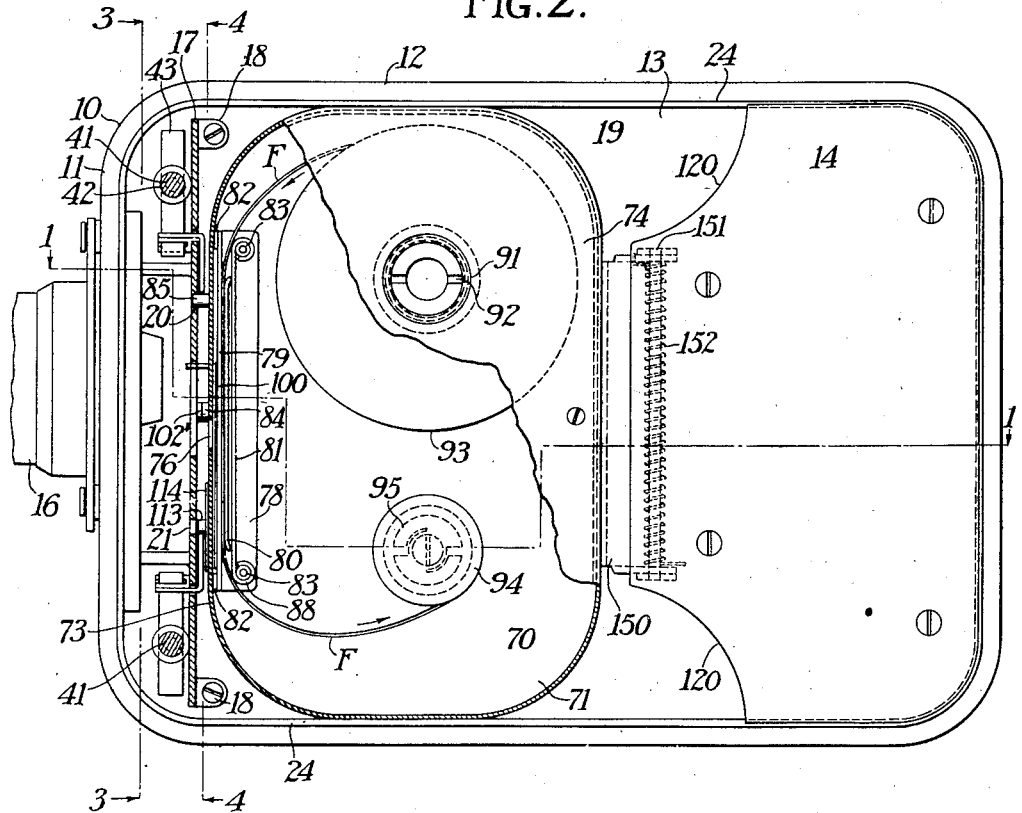

Referring now to Figs. 1 and 2, the motion picture camera comprises a casing 10 having a front lateral wall 11, an upper lateral wall 12, a mechanism plate 13, and a rear cover plate 14. The lateral wall 11 is heavier than any of the other walls of the camera and is provided with a shouldered aperture 15 which receives and properly locates an objective 16 so that its exposure opening is properly positioned in the camera. A locating plate 17 is fixed to the mechanism plate 13 by screws 18, and forms the front boundary of the magazine chamber, indicated broadly as 19, and said locating plate is provided with a pair of holes 20 and 21 for the purpose hereinafter described. The locating plate is also provided with an exposure opening 20' which is in alignment with the objective 16, and the exposure opening is elongated at one side, as shown at 21' in Fig. 4, to allow the film claw 22' to extend through the locating plate and into the film magazine to engage the film strip F therein.

A door 22 hinged at 23 to the lower edge of the casing 10 serves as one side wall of the camera, and serves to close the magazine chamber 19. A pair of spring fingers 23' are fastened to the inside face of the door 22, and are adapted to engage the side wall of the film magazine when the door is closed in order to resiliently hold said magazine against lateral movement in the magazine chamber 19, see Fig. 1. The edges of the camera casing are provided with a continuous tongue 24 which the door 22 overlaps in its closed position to give a light tight joint. Any suitable form of latch can be provided for locking the door 22 in its closed position, but for the purpose of illustration, I have shown a hook 25 fastened to the inside face of the door 22 which is adapted to be engaged and held by means of a catch member 26 which is rotatably mounted on the under side of the top lateral wall 12 so as to be controlled by swinging a bar member 27 to the end of which is fastened a finger-piece 28. Integral with the catch 26 is a disk 29 which is provided with two counter-sunk holes 30 into which a spring pressed ball 31 is adapted to snap and frictionally hold the catch member 26 in either its open or closed position.

Referring now particularly to Figs. 3 and 4, a pair of bellcranks 32 are pivotally mounted on the side of the locating plate 17, one above and one below the exposure opening 21' in the plate 17, facing the magazine chamber 19 so that one arm 33 of each bellcrank moves in an arc longitudinally of the locating plate. The other arm 34 of each bellcrank 32 has a vertically upturned end 35 which is adapted to extend through arcuate slats 36 in the locating plate, and be so located relative to the arm 33 of the bellcrank that it moves substantially transversely of the locating plate when the bellcrank is rotated on its pivot. Integral with or suitably mounted on the longitudinal edge of the locating plate 17 is a cover plate 40 which is adapted to overhang the forward end of the magazine chamber 19, see Fig. 1, and this plate serves to cover the hereinafter described magazine shutter operating mechanism as well as serving other purposes hereinafter mentioned. For purposes of clarity, this cover plate 40 is not shown in Fig. 2. A pair of plungers 41 are slidably mounted in the apparatus forwardly of the locating plate 17 by having a reduced end extending through an aperture in the mechanism plate 13 and having an enlarged end 42 extending through a pair of aligned apertures, one being in a bearing member 42' which is integral with the camera frame while the other aperture is in the cover plate 40, see Fig. 4. A U-shaped leaf spring member 43 is slidably mounted on each of the plungers 41 by having its legs pierced by said plunger, and one end of leg 44 of each U-shaped spring engages a slot 45 in the upturned end 35 of the bellcrank arm 34, while the other leg 46 of the U-spring 43 is free. The relative position of the bellcrank arm 34 and the leg 44 of the leaf spring 43 necessitates the leg 44 being slightly curved so as to render the engagement of the two satisfactory throughout their entire movement, as shown in Figs. 3 and 4.

A coil spring 41' surrounding each plunger 41 is compressed between the mechanism plate 13 and the leaf spring 43, and since the U-shaped leaf spring 43 abuts the shoulder 50 on the large end 42 of the plunger, the normal pressure of the coil spring is transmitted to the plunger 41 normally forcing it to a position wherein it extends beyond the confines of the apparatus and into the path of the door 22, see Fig. 4. The shoulder 50 on the plunger 41 also serves to limit the travel of the plunger so that its reduced end does not become disengaged from the mechanism plate 13. A pressure member 150 is pivotally mounted upon a hinge pin 151 just below the edge of the rear cover plate 14, and is urged in a counter-clockwise direction by a coil spring 152 which encircles the hinge pin.

The film magazine, shown here for illustration, is identical with the film magazine specifically described in my copending application Serial Number 80,163 filed May 16, 1936 to which reference can be made for a detailed description thereof, and comprises a casing 70 having a side wall 71, and a lateral wall 72 including a front lateral wall 73 and a rear lateral wall, not shown, which is parallel to the front lateral wall 73. A magazine cover 74 engages the edges of lateral wall 72 to enclose the magazine casing 70. The front lateral wall 73 of the magazine casing 70 is provided with an exposure aperture 75, an exposure aperture 76, and an elongated slot 77.

The film gate is within the film magazine and comprises a frame member 78, a gate plate 79, a pressure pad 80, and a spring member 81. The frame member 78 carries at opposite ends arm 82 and post 83, see Fig. 2.

The gate plate 79 is provided with exposure apertures which register with exposure apertures 75 and 76 in the front lateral wall 73 of the magazine casing 70 when the gate plate is mounted upon said frame member 78. A focusing pin 84 is fixed to the center of gate plate 79, and framing pin 85 is fixed to the gate plate 79 adjacent one end thereof. A plurality of longitudinal film engaging portions 86 extend along gate plate 79.

The pressure pad is also provided with a plurality of longitudinal film engaging portions 87 which cooperate with the film engaging portions 86 on the gate plate 79, see Fig. 6. The spring member 81 has curved ends 88 for fitting over the post 83 of frame member 78, and includes a pair of spring arms 89 and 90 for resiliently pressing upon the rear of pressure pad 80.

The supply film core 91 has engaging lugs 92, and is mounted between the side wall 71 and cover 74 of the magazine casing 70, and carries the supply roll of film 93. The takeup film core 94 is rotatably mounted in a known manner between side wall 71 and cover 74 of the film magazine, and is also provided with engaging lugs 92 which are adapted to engage a spring clutch member 95 whereby it is connected to the driving mechanism of the camera, not shown. The film F extends from the supply film roll 93 through the gate between gate plate 79 and pressure pad 80, and to the takeup film core 94. The film gate construction just described is particularly well suited for the exposure of laterally adjacent longitudinally extending sequences of pictures on the same film. The film engaging portions 86 and 87 engage the margins and center line of the film F, while the tabs 89 and 90 of the spring member 81 bear on each side of the pressure pad 80 and produce individual pressure on the film F over each exposure aperture in the gate plate 79.

A closure means is provided on the film magazine between the front lateral wall 73 and the gate plate 79. Such a closure means comprises a shutter 100 having a blade 101 for covering the exposure aperture 75, and having a blade 102 for covering the exposure aperture 76. A bushing 103, see Fig. 6, is inserted in the center of shutter 100 and is mounted upon the focusing pin 84 which extends from gate plate 79 and through the lateral wall 73 of the magazine casing 70 to the exterior of the film magazine. The front surface of the focusing pin 84 is placed a predetermined distance from the surfaces of the film engaging portion 86 so that abutment of the pin against a locating pin 102' on the locating plate 17 will accurately locate the film held against the film engaging portions 86 of the gate plate 79 in the focal plane of the objective 16.

The operating member for the shutter 100 includes a link 110 which is eccentrically pivoted at one end by a pin 111 to the shutter 100. The other end of the link 110 is provided with a flange 112 and carries a pin 113 extending through elongated slots 77 in the front lateral wall 73 of the magazine casing 70. A guard disk 114 is fastened to pin 113 and covers said elongated slot 77. A wire spring 115, see Fig. 5, fastened to the inside of the side wall 71 of the magazine casing, engages the flange 112 on link 110 and normally urges the operating member and shutter 100 to a closed position, shown in Fig. 5.

The operation of the shutter operating mechanism located on the locating plate 17 of the camera will now be described. When the door 22 is opened, the plungers 41 will be forced to the position shown in Fig. 4 by coil springs 41' wherein they extend outside of the camera casing 10. This movement of the plungers 41 also allows the coil spring 41' to move the U-shaped leaf spring 43 whereby the legs 44 thereof move the bellcranks 32 to their inoperative position. The film magazine is then inserted into the chamber 19 so that the locating pin 85 in the front lateral wall thereof enters the hole 20 in the locating plate 17 whereupon the magazine is properly positioned in the chamber with its exposure aperture 75 framed with the aligned exposure openings in the locating plate 17 and objective 16. The pressure member 150 engages the rear lateral wall of the film magazine and forces said magazine forwardly of the chamber 19 into a position wherein the focusing pin 84 of the magazine abuts the locating pin 102' and the locating plate 17 to properly locate the film strip in the focal plane of the objective. Due to the fact that the cover plate 40 overlaps the forward end of the magazine chamber 19, in order to insert the magazine into the chamber it must be inserted at an angle, not shown, the forward end first, and is then snapped down against the mechanism plate 13 in front of the pressure member 150. After the magazine is inserted in the magazine chamber and when the door 22 is opened, referring to Fig. 4, wherein the shutter pin 113 is indicated, it can be seen that said shutter pin 113 will be in the path of, and just abutted by, the arm 33 of the lower bellcrank 32 while the arm 33 of the upper bellcrank is some distance above the hole 20 in the locating plate through which the locating pin 85 will extend.

When the door 22 is closed it will engage and press the plungers 41 inwardly against the action of coil spring 41', and the spring fingers 23' on the door will engage the side wall of the film magazine to resiliently hold it against lateral movement in the film magazine chamber 19. As the plungers 41 are pressed inwardly, the shoulders 50 thereon engage and move the U-shaped member 43 thereby causing the leg 44 thereof to rotate the bellcrank 32 on the locating plate 17. As the bellcranks are rotated about their pivots, the arm 33 of the lower one engages the shutter pin 113 and slides it longitudinally of the magazine to cause an opening of the shutter 100. The locating pin 85 is located on the magazine so as to be symmetrical with the shutter pin 113 when the shutter pin is in its shutter opening position, and due to this relative location of the two, the arm 33 of the upper bellcrank lever 32 will not abut the locating pin 85 until after the shutter pin has moved to the shutter opening position by the other bellcrank. After the shutter 100 is moved to full open position, any additional movement of the plungers 41 in closing the door will cause a further compression of the coil spring 41' or will cause a compression of the U-shaped spring member 43. Therefore, the combined spring action of the coil springs 41' and the U-shaped springs 43, or the latter alone in case the coil springs 41' are designed to be entirely compressed before the door 22 is completely closed, is an essential feature of the connection between the plungers 41 and the bellcrank 32, because any overtravel necessary in closing the door after the shutter is opened will be absorbed by this spring connection and will not be transmitted to the shutter operating pin 113 with possible damaging results.

After the initial run of film has been completed, the door 22 is opened whereupon the plungers 41 are projected from the camera casing and the U-shaped springs 43 are moved transversely of the locating plate 17 by the coil springs 41'. The movement of the spring member 43 causes a counter-clockwise rotation of the bellcrank 32 about their pivots, see Fig. 4, and causes the arm 33 of each bellcrank to be removed from engagement with the locating pin 85 and the shutter operating pin 113 on the film magazine. When the arm 33 of the lower bellcrank 32 releases the shutter pin 113, the shutter 100 is automatically closed by the spring 115 in the magazine casing which normally acts to return the shutter to closing position. The rear cover plate 14 of the camera casing is provided with cut out portions 120 which provide finger recesses into which the fingers can be extended for grasping the film magazine to snap the same out of the chamber 19.

The film magazine is now inverted and reinserted into the magazine chamber, so that the exposure apertures 76 in the magazine will be in alignment with the aligned exposure openings in the locating plate 17 and the objective 16. In this position the locating pin 85 on the magazine will enter the lower hole 21 in the locating plate 17, and the shutter pin 113 will be actuated by the upper bellcrank 32 when the door 22 is closed, in the same manner as described above. In this position the focusing pin 84 on the magazine abuts the locating pin 102' on the locating plate as before to properly position the film strip F in the focal plane of the objective 16.

In Figs. 7 and 8, I have shown a modified form of shutter operating mechanism which is operated by the closure of the camera door, but one which will operate the shutter of the magazine constructed as above described. The camera is constructed the same as the one described in connection with the preferred form of the invention and includes a casing 10 in which is mounted a mechanism plate 13, and a locating plate 17 as described above, said locating plate being broken away in the drawings for the purpose of clarity. A pair of bellcranks 32, only one being shown, are pivotally mounted on the inner side of the locating plate 17 in the same manner as was described above, with one arm 33 lying on the side of the locating plate toward the magazine chamber while a second arm 34 has a slotted, upturned end 35 which extends through an arcuate slot in the locating plate 17 to the other side thereof. Up to this point the structure shown in Figs. 7 and 8 is exactly the same as that structure described in connection with the preferred form of the invention, and the modification is found in the remaining structure to be described.

A stud 130 is fixed to the face of the locating plate 17 opposite to that on which the bellcranks 32 are mounted, and to this stud 130 is fastened one end of a U-shaped spring 131. The end of leg 132 of the U-shaped spring 131 engages the slot 45 in the upturned end 35 of the bellcrank 32 so that its movement due to the resiliency of the spring 131 tends to rotate the bellcrank 32 about its pivot. The door 22 hinged at 23 to the camera casing 10 serves to close the magazine chamber in the camera, and said door carries two pins 134, only one of which is shown, which are adapted to engage and compress the U-shaped spring member 131 when the door is closed.

Referring now, particularly to Fig. 8, where the camera is shown with the magazine in place and with the door open, the U-shaped spring member 131 is expanded so that its leg 132 rotates the bellcrank 32 to its inoperative position. In this position of the bellcrank 32 the arm 34 thereof is retracted from the path of the shutter pin 113 so that the shutter is maintained closed by the spring 115 in the magazine chamber. Now referring to Fig. 7, when the door 22 is closed, the pin 134 thereof engages the leg 132 of the U-shaped spring 131, and compresses it whereupon the bellcrank 32 is rotated and its arm 34 moves the shutter operating pin 113 to open the shutter 100. As the door 22 is opened, the U-springs 131 are allowed to expand and the bellcrank 32 is rotated so that the arm 34 thereof is retracted from the path of the shutter pin and the shutter is again closed by the spring 115. The resiliency of the leg 132 of the U spring member 131 will compensate for any overtravel of the door which might be necessary in closing said door after the shutter 100 has reached its open position, and will thus absorb any excessive force which might otherwise damage parts of the mechanism. In connection with the modified form of the invention shown in Figs. 7 and 8, it is to be understood that although only one bellcrank 32 and operating mechanism therefor is shown, due to the partial showing, there is a second identical bellcrank and operating structure so mounted and located above the exposure aperture as to function on the inversion of the film magazine as described in the preferred form of the invention.

Although I have shown this novel shutter operating structure in connection with a Cine Eight type of magazine, which involves inverting the magazine, it is to be understood that it can be adapted to a magazine camera which will accommodate magazines not requiring inversion, i. e. 16 mm. type without going beyond the scope of the present invention. In a camera using a magazine of 16 m. m. film, or a film which is entirely exposed without being inverted, there would only be one position in which the magazine ever would be placed in the camera and one bellcrank and its operating mechanism could be omitted from the apparatus; and a simplified structure would result.

From the above description, it will be understood that my novel magazine shutter operating mechanism provides a simple and positive means of controlling the shutter through the opening and closing of the camera door. The mechanism also lends itself to easy and rapid assembly, because it includes means for compensating for any overtravel of the door which might be necessary in reaching its closed position after the magazine shutter has been opened so that no excessive or damaging force will be transmitted to the parts of the mechanism.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare is new and desire to secure by Letters Patent of the United States is:

1. In a motion picture apparatus provided with a magazine chamber, and a door for closing the same, the combination with a film magazine adapted to be inserted into and removed from said magazine chamber, and comprising a casing having a lateral wall provided with an exposure aperture, a shutter for covering said aperture, means in said casing normally holding said shutter in covering relation with respect to said aperture, a pin connected to said shutter and extending from the magazine, of an abutment in said apparatus against which said film magazine is held for the proper location thereof, and an operating means in the apparatus operated by said door in closing and for engaging said pin to open said shutter when operated, said operating means permitting, after said shutter is open, additional movement of said door without any additional movement of said shutter.

2. In a motion picture apparatus provided with a magazine chamber, the combination with a film magazine comprising a casing having a lateral wall provided with an opening, a shutter for covering said opening, a means on said casing for normally maintaining said shutter in covering position, and an actuating member operatively connected to said shutter and including a portion available from the exterior of said casing, of positioning members on said apparatus, at least one of which is movable and engages said film magazine to locate the same within said magazine chamber, and an operating means operated by said movable positioning member and for engaging said portion of said actuating member to open said shutter, and including a resilient member for permitting, after said shutter is open, additional movement of said movable positioning member without any additional movement of said shutter.

3. In a motion picture apparatus provided with a magazine chamber, the combination with a film magazine comprising a casing having a lateral wall provided with an opening, a shutter for covering said opening, a means on said casing for normally maintaining said shutter in covering position, and an actuating member operatively connected to said shutter and including a portion available from the exterior of said casing, of positioning members on said apparatus, at least one of which is movable and engages said film magazine to locate the same within said magazine chamber, and a lever in said apparatus operated by said movable positioning member and for engaging said portion of said actuating member to open said shutter, and a spring connected to said lever and located to be engaged by said movable positioning means whereby said shutter is opened through the movement of the movable positioning member, said spring compensating for any additional movement of the movable positioning member after the shutter is open.

4. In a motion picture apparatus provided with a magazine chamber, a door for closing the same, the combination with a film magazine comprising a casing having a lateral wall provided with an opening, a shutter for covering said opening, a means on said casing for normally maintaining said shutter in covering position, and an actuating member operatively connected to said shutter and including a portion available from the exterior of said casing, of positioning members on said apparatus, at least one of which is movable and engages said film magazine to locate the same within said magazine chamber, and an operating means operated by said door and for engaging said portion of said actuating member to open said shutter, and including a resilient member for permitting, after said shutter is open, additional movement of said door without any additional movement of said shutter.

5. In a motion picture apparatus provided with a magazine chamber, the combination with a film magazine comprising a casing having a lateral wall provided with an opening, a shutter for covering said opening, a means on said casing for normally maintaining said shutter in covering position, and an operating member for said shutter and including a pin extending through the lateral wall, of a locating plate in said apparatus against which said film magazine is held for the proper location thereof, a door for closing said magazine chamber, a bellcrank pivotally mounted on said locating plate with one end thereof extending into the path of the pin on the shutter, a spring member in said apparatus connected to the other end of the bell crank and normally acting thereon to remove the bell crank from the path of the pin on the shutter, said spring being located to be engaged and compressed by the door when it is moved to its closed position and being adapted to compensate for any additional movement of the door after the shutter is open.

6. In a motion picture apparatus provided with a magazine chamber, the combination with a film magazine comprising a casing having a lateral wall provided with an exposure aperture, a shutter rotatably mounted in said casing for covering said aperture and means on said casing for normally maintaining said shutter in covering position, an operating member for said shutter and including a pin extending through the lateral wall and being slidable relative thereto, of a door for closing said magazine chamber and comprising a magazine therein, a lever in said apparatus operated by said door and for engaging and sliding said pin on the shutter to open the shutter, and a spring connected to said lever and located to be engaged by said door whereby the shutter is opened through the movement of the door to closing position, said spring compensating for any additional movement of the door after the shutter is opened.

7. In a motion picture apparatus provided with a magazine chamber, a door for closing the same, the combination with a film magazine comprising a casing having a lateral wall provided with an exposure aperture, a shutter for covering said aperture, a resilient means for normally holding said shutter in covering position, an operating member for said shutter and including a pin extending through the lateral wall, of a locating plate in said apparatus against which said film magazine is held for proper location thereof, a bell crank pivotally mounted on the locating plate to extend into the path of the pin on the shutter, and operating means for said bell crank lever including a spring pressed plunger extending into the path of the door whereby the shutter is automatically moved to open the exposure aperture when the door is closed.

8. In a motion picture apparatus provided with a magazine chamber, a door for closing the same, the combination with a film magazine comprising a casing having a lateral wall provided with an exposure aperture, a shutter for covering said aperture, a resilient means for normally holding said shutter in covering position, an operating member for said shutter and including a pin extending through the lateral wall, of a locating plate in said apparatus against which said film magazine is held for proper location thereof, a bell crank pivotally mounted on the locating plate to extend into the path of the pin on the shutter, an operating means for said bell crank lever, and including a spring pressed member engaging and normally forcing said bell crank into its inoperative position, and a plunger slidably mounted in said apparatus and associated with said spring pressed member to be normally forced into the path of the door of the magazine chamber whereby the shutter is automatically moved to uncovering position when said door is closed.

9. In a motion picture apparatus provided with a magazine chamber, a door for closing the same, the combination with a film magazine comprising a casing having a lateral wall provided with an exposure aperture, a shutter for covering said aperture, a resilient means for normally holding said shutter and including a pin extending through the lateral wall, of a locating plate in said apparatus against which said film magazine is held for proper location thereof, a bell crank pivotally mounted on the locating plate to extend into the path of the pin on the shutter, an operating means for said bell crank lever, and comprising a plunger slidably mounted in the apparatus, an arm carried by said plunger and having one end in engagement with the bell crank lever whereby a sliding movement of the plunger will effect a rotation of said bell crank, and a spring member normally forcing the plunger and arm carried thereby to a position wherein the arm moves the bell crank to its inoperative position and the plunger extends from the apparatus to be engaged and operated by the door in closing.

10. In a motion picture apparatus provided with a magazine chamber, a door for closing the same, and a projection on said door, the combination with a film magazine comprising a casing having a lateral wall provided with an exposure aperture, a shutter for covering said aperture, a resilient means for holding said shutter in covering position, an operating member for said shutter and including a pin extending through the lateral wall, of a locating plate in said apparatus against which said film magazine is held for the proper location thereof, a lever pivotally mounted on the locating plate and movable in the path of the pin on said shutter for abutting and operating the same, a spring pressed operating member in said apparatus connected to and normally forcing said lever out of the path of the pin on the shutter, the spring pressed member being located to be engaged and operated by the projection on the door when the door is closed.

11. In a motion picture apparatus provided with a magazine chamber, a door for closing the same, a projection on said door, the combination with a film magazine comprising a casing having a lateral wall provided with an exposure aperture, a shutter for covering said aperture, a resilient means for holding said shutter in covering position, an operating member for said shutter and including a pin extending through the lateral wall, of a locating plate in said apparatus against which said film magazine is held for the proper location thereof, a lever pivotally mounted on the locating plate and movable in the path of the pin on said shutter for abutting and operating the same, a bell crank pivotally mounted on the locating plate, one arm of said bell crank being adapted to extend into the path of the pin on the shutter to abut said pin and operate the shutter when the bell crank is rotated about its pivot, and operating means for rotating said bell crank about its pivot and comprising a pair of spring members mounted in the apparatus to engage and normally hold the bell crank in its inoperative position, said spring members being adapted to be engaged and compressed by the projection on the door when said door is closed to open said shutter, and being adapted to compensate for any additional movement of the door after the shutter is open.

12. The combination with a motion picture apparatus including a magazine chamber, a door for closing the same, and having a locating plate provided with an exposure opening, of a film magazine adapted to be inverted with respect to said magazine chamber and comprising a casing having a lateral wall provided with a pair of displaced exposure apertures, cooperating means on said film magazine and on said locating plate for locating the magazine in the chamber whereby opposite exposure apertures are framed with the exposure opening in alternate inverted positions of the magazine, a shutter normally covering the exposure apertures in the film magazine, an operating member for said shutter and including a pin extending through the lateral wall, a pair of levers pivotally mounted on the locating plate each movable in the path of the pin on the shutter for abutting and operating the same, but only one of said levers being effective for each position of the magazine in the chamber, and cooperating means between the levers and the door of the magazine whereby the shutter is automatically moved to uncover the exposure apertures when the door is closed.

13. The combination with a motion picture apparatus including a magazine chamber, a door for closing the same, and having a locating plate provided with an exposure opening, of a film magazine adapted to be inverted with respect to said magazine chamber and comprising a casing having a lateral wall provided with a pair of displaced exposure apertures, cooperating means on said film magazine and on said locating plate for locating the magazine in the chamber whereby opposite exposure apertures are framed with the exposure opening in alternate inverted positions of the magazine, a shutter normally covering the exposure apertures in the film magazine, an operating member for said shutter and including a pin extending through the lateral wall, a pair of bell cranks pivotally mounted on the locating plate, one arm of each bell crank being adapted to extend into the path of the pin on the shutter for abutting and operating the same but only one of said bell cranks being effective for alternate positions of the film magazine, and operating means for each of said bell crank levers and including a spring pressed plunger located to extend into the path of the door whereby the shutter is automatically moved to open the exposure apertures when the door is closed.

14. The combination with a motion picture apparatus including a magazine chamber, a door for closing the same, said door including a pair of projections, and having a locating plate provided with an exposure opening, of a film magazine adapted to be inverted with respect to said magazine chamber and comprising a casing having a lateral wall provided with a pair of displaced exposure apertures, cooperating means on said film magazine and on said locating plate for locating the magazine in the chamber whereby opposite exposure apertures are framed with the exposure opening in alternate inverted positions of the magazine, a shutter normally covering the exposure apertures in the film magazine, an operating member for said shutter and including a pin extending through the lateral wall, a pair of levers pivotally mounted on the locating plate each movable in the path of the pin on the shutter for abutting and operating the same but only one of said levers being effective for alternate positions of the film magazine in the chamber, a pair of spring pressed operating members in said apparatus connected to and normally forcing said levers out of their operative positions, each spring pressed member being located to be engaged and operated by the projections on the door when said door is closed.

15. The combination with a motion picture apparatus including a magazine chamber, a door for closing the same, said door including a pair of projections, and having a locating plate provided with an exposure opening, of a film magazine adapted to be inverted with respect to said magazine chamber and comprising a casing having a lateral wall provided with a pair of displaced exposure apertures, cooperating means on said film magazine and on said locating plate for locating the magazine in the chamber whereby opposite exposure apertures are formed with the exposure opening in alternate inverted positions of the magazine, a shutter normally covering the exposure apertures in the film magazine, an operating member for said shutter and including a pin extending through the lateral wall, a pair of bell cranks pivotally mounted on the locating plate, one arm of each bell crank being adapted to extend into the path of the pin on the shutter to abut and operate said shutter when the bell crank is rotated about its pivot but only one bell crank being operative for any one inverted position of the magazine in the magazine chamber, and operating means for rotating each of said bell cranks about its pivot and comprising a pair of spring members being mounted in the apparatus to engage and normally hold the bell cranks in their inoperative positions, said spring members being located to be engaged and compressed by the projections on the door when said door is closed.

HENRY N. FAIRBANKS.